(12) United States Patent
Truax (10) Patent No.: US 10,519,906 B2
(45) Date of Patent: Dec. 31, 2019

(54) NATIVE FUEL MODULE FOR SPARK IGNITION FUEL INJECTED ENGINES

(71) Applicant: ADVANCED FUEL DYNAMICS, Inc., Troy, TX (US)

(72) Inventor: Ryan Truax, Troy, TX (US)

(*) Notice: Subject to any disclaimer, the term of this patent is extended or adjusted under 35 U.S.C. 154(b) by 0 days.

(21) Appl. No.: 15/701,389

(22) Filed: Sep. 11, 2017

(65) Prior Publication Data
US 2018/0128220 A1 May 10, 2018

Related U.S. Application Data

(63) Continuation-in-part of application No. 14/597,655, filed on Jan. 15, 2015, now abandoned.

(51) Int. Cl.
| | |
|---|---|
| *B60T 7/12* | (2006.01) |
| *F02M 37/00* | (2006.01) |
| *F02D 41/40* | (2006.01) |
| *F02D 41/00* | (2006.01) |
| *F02D 41/34* | (2006.01) |
| *F02D 41/24* | (2006.01) |
| *F02D 41/28* | (2006.01) |
| *F02D 19/06* | (2006.01) |

(52) U.S. Cl.
CPC ..... *F02M 37/0082* (2013.01); *F02D 41/0025* (2013.01); *F02D 41/2461* (2013.01); *F02D 41/28* (2013.01); *F02D 41/34* (2013.01); *F02D 41/402* (2013.01); *F02M 37/0052* (2013.01); *F02D 19/0634* (2013.01); *F02D 2041/285* (2013.01); *F02D 2200/0606* (2013.01); *F02D 2200/0611* (2013.01); *F02D 2400/11* (2013.01); *Y02T 10/36* (2013.01); *Y02T 10/44* (2013.01)

(58) Field of Classification Search
CPC ..... F02D 19/00; F02D 19/021; F02D 19/0613
USPC ................ 701/103–105; 123/575, 576, 304; 324/663
See application file for complete search history.

(56) References Cited

U.S. PATENT DOCUMENTS

| | | | | |
|---|---|---|---|---|
| 4,909,225 A | * | 3/1990 | Gonze | F02D 19/0605 123/1 A |
| 4,945,880 A | * | 8/1990 | Gonze | F02D 41/0025 123/1 A |
| 5,459,999 A | * | 10/1995 | Hosoya | F01N 3/2006 60/284 |
| 6,078,861 A | * | 6/2000 | Zimmerman | F02D 41/1474 123/479 |
| 6,237,575 B1 | * | 5/2001 | Lampert | F02D 41/0042 123/516 |

(Continued)

*Primary Examiner* — John Kwon
(74) *Attorney, Agent, or Firm* — Patrick Reilly (57) ABSTRACT

Some embodiments of the present disclosure include a system for allowing spark ignition fuel injected engines to function on a plurality of fuels. The system may include an engine system including an engine control module operatively attached to a fuel injector, and a fuel tank attached to the fuel injector, a fuel content sensor configured to sense a content of a fuel in the engine system before combustion of the fuel, and a fuel control module placed inline with the fuel injector and the fuel content sensor, the fuel control module configured to receive fuel content information from the fuel content sensor and make a change to the fuel injector pulse width based on the fuel content information, if necessary.

14 Claims, 8 Drawing Sheets

(56) References Cited

U.S. PATENT DOCUMENTS

| | | | | |
|---|---|---|---|---|
| 7,770,847 B1* | 8/2010 | Severson | ............... | A63H 19/24 |
| | | | | 246/1 C |
| 2003/0020494 A1* | 1/2003 | Desmier | .............. | G01N 27/228 |
| | | | | 324/667 |
| 2003/0117153 A1* | 6/2003 | McKenzie | ........... | G01N 27/226 |
| | | | | 324/663 |
| 2013/0261935 A1* | 10/2013 | Jankovic | ............... | F02D 41/047 |
| | | | | 701/104 |
| 2015/0198109 A1* | 7/2015 | Truax | ..................... | F02D 41/30 |
| | | | | 123/478 |
| 2017/0235848 A1* | 8/2017 | Van Dusen | ............. | H04L 41/04 |
| | | | | 705/12 |

\* cited by examiner

NATIVE FUEL MODULE FOR SPARK IGNITION FUEL INJECTED ENGINES

CO-PENDING APPLICATION

The present Nonprovisional patent application is a Continuation-in-Part Nonprovisional patent application to, and claims the priority date of, U.S. Nonprovisional patent application Ser. No. 14/597,655 filed on Jan. 15, 2015. U.S. Nonprovisional patent application Ser. No. 14/597,655 is incorporated by reference in its entirety and for all purposes into the present Nonprovisional patent application.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The embodiments herein relate generally to engines, and more particularly, to an alternative fuel module for spark ignition fuel injected engines, allowing an engine to use two or more different types of fuel.

Most engines can only run on one type of fuel. Conventional devices that aim to solve this problem are reactive in design, meaning that they respond based on what the engine has already done. Thus, reactive systems do not work properly, because they are slow to respond due to relying on information received after combustion has already occurred.

Additionally, conventional systems make constant changes to the fuel system to run on ethanol. Conventional systems rely on the factory installed computer in a vehicle to pull fuel back so that it will still run correctly on conventional gasoline. Thus, other systems affect the functionality of the factory installed computer. This limits the system and often maxes it out, because the change required is often more than it is capable of achieving.

Therefore, there is a long felt need for a system and method applicable to spark ignition fuel injected engines that incorporate sensing fuel content before combustion and make adjustments to engine operations in view of the determination of a fuel content mix and enabling the hosting engine to better perform using two or more different types of fuel.

SUMMARY AND OBJECTS OF THE INVENTION

Towards these and other objects of the method of the present invention (hereinafter, "the invented method") that are made obvious to one of ordinary skill in the art in light of the present disclosure, the present invention (hereinafter, "the invented system") enables control of the operations of one or more injectors of a prior art spark ignition fuel injected engine of in view of a measurement of a relative fuel content of one distinguishable component of a fuel mixture.

The invented system includes means for allowing prior art spark ignition fuel injected engines to function with a fuel mixture that includes two or more fuels or other components. Certain alternate preferred embodiments of the invented system comprise a fuel control module coupled with a fuel content sensor wherein the fuel content sensor is configured to sense a relative proportional content of a fuel component of the fuel mixture prior to combustion of the fuel mixture within the engine system.

The invented system engages with a prior art engine system (hereinafter, "the engine system"), wherein the engine system includes an engine control module operatively attached and coupled to both a fuel tank and individually to one or more of fuel injectors, wherein the fuel tank contains a fuel mixture and the fuel mixture is channeled from the fuel tank and to the fuel injector(s). It is understood that the prior art engine control module generates injector pulses that might each be intended for delivery to and control of, a particular fuel injector of the engine system.

The fuel control module of the invented system is preferably communicatively disposed between the prior art engine control module (hereinafter, "the ECM") of the engine system and one or more fuel injectors of the engine system. The fuel control module of the invented system (hereinafter, "the FCM") is enabled to receive injector pulses as generated by the engine control module. The FCM of the invented system receives fuel content information from the fuel content sensor and generate an altered fuel injector pulse having a derived fuel injector pulse width that is based upon the fuel content information generated by the fuel content sensor. The FCM thereupon preferably and selectively transmits each altered fuel injector pulse to one or more fuel injectors.

In certain still alternate preferred embodiments of the present invention the fuel content sensor is or comprises an alcohol content sensor, an oxygen sensor, an air metering sensor, a fuel temperature sensor, and/or an air temperature sensor.

Certain yet alternate preferred embodiments of the present invention comprise a fuel content sensor positioned externally of the engine system fuel tank and is configured to sense a content of fuel in the engine system before combustion of the fuel, wherein the FCM is placed inline with the fuel injector(s) of the engine system and the fuel content sensor and the FCM is configured to both receive fuel content information from the fuel content sensor and to alter the fuel injector pulse width, or generate a new fuel injector pulse. based on the fuel content information.

A first alternate preferred embodiment of the invented method includes one or more of the aspects of (a.) measuring a current alcohol level of fuel within a fuel stream of an engine with the fuel content sensor; (b.) sending a first signal including the current alcohol level of the fuel stream to the from the fuel content sensor to the FCM; (c.) determining if the current alcohol level matches up with a predetermined optimal alcohol level; (d.) providing a fuel flow valve(s); (e.) sending an adjustment signal to the fuel flow valve(s) from the FCM, wherein the adjustment signal informs the fuel flow valve(s) how much additional fuel of the fuel stream to inject within the engine or how much fuel of the fuel stream to prevent from entering the engine; and (f.) adjusting the amount of fuel injected within the engine via the fuel flow valve(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The device of the present disclosure may be used to allow an engine to run on multiple types of fuel and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various alternative and optional elements of the invented system adaptable for integration with spark ignition fuel injected engines enable a prior art engine to run off of various types of fuel mixture of the present disclosure may be related as disclosed in the following exemplary fashion. The disclosure provided herein of certain exemplary alternate preferred embodiments of the invented method is not intended to limit the scope or nature of the relationships between the various elements, wherein the following examples are presented as illustrative examples only.

By way of example, and referring generally to the Figures and particularly to FIG. 1 through FIG. 4, certain other alternate preferred embodiments of the invented system 2 (hereinafter, "the first system 2") enable spark ignition fuel injected engines to run off of a varieties of fuel mixtures, wherein such embodiments of the first system 2 comprise (1.) an FCM 12 placed inline with a fuel injector 28 of a host engine system and (2.) an FCS 14 of the first system 2 configured to sense the content of the fuel mixture prior to combustion in the engine. In various alternate preferred embodiments of the invented method, the FCS 14 may be or comprise fuel content sensor is a sensor selected from the group consisting of an oxygen sensor, an air metering sensor, a fuel temperature sensor, and an air temperature sensor. In addition and/or in the alternative, the FCS 14 may be or comprise a GM Part Number 13577394™ fuel sensor, a GM Part Number 13577429™ fuel sensor, or GM Part Number 13577329™ fuel sensor as marketed by General Motors Corporation of Detroit, Mich., or other suitable fuel sensor known in the art.

The FCM 12 receives the fuel content information from the FCS 14 and selectively makes a change to the, or generates a new, injector pulse width signal. For example, if the FCS 14 senses that the fuel comprises the fuel mixture intended to be used with the engine per the factory system (i.e., standard fuel), the FCM 12 will not modify the injector pulse width signal as received from the ECM and will deliver the original injector pulse width signal, or alternatively generate and deliver an equivalent newly generated injector pulse width signal, to one or more injectors 28. In such instances, the factory installed ECM 10 may continue to control the injectors 28 with little or no interference by the invented system 2. Alternatively, if the FCS 14 senses that the fuel comprises a fuel mixture other than the standard fuel mixture, or the standard fuel mixture mixed with a non-standard fuel, the FCM 12 will alter the injector pulse width, or alternatively generate a new signal with a different injector pulse width then as received from the ECM 10, allowing the engine to better run off of the actual fuel mixture received by the injectors 28.

The present disclosure will for the sake of clarity of explanation generally refer to the interaction of a single injector 28 with both the invented system 2 and the prior art engine system; it is understood that additional alternate preferred embodiments of the invented system and the first system 2 are adapted to interact with and control tow or more injectors 28 of a prior art engine system/

Figure 1:
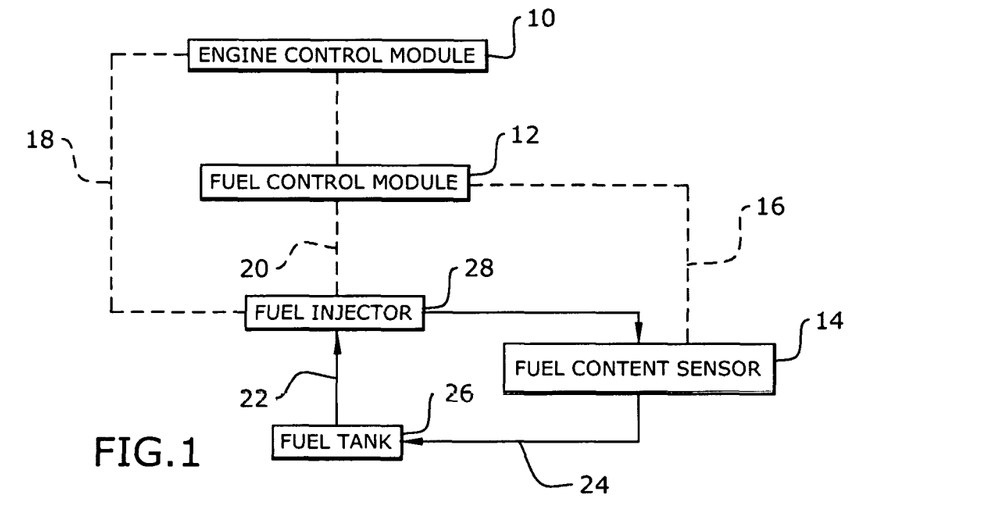
FIG. 1 is a schematic view of a first preferred embodiment of the invented system with a fuel content sensor (hereinafter, "the FCS") on a return side of the fuel system.

As shown in FIG. 1, the first system 2 may be configure with the FCS 14 on the return side of a fuel system of the hosting engine system, wherein the FCS 14 is connected to a fuel return line 24 of the engine system positioned between the fuel injector 28 and a fuel tank 26, wherein the ECM 10 is configured to provide power to the fuel injector 28 by an injector power connection 18 and is operatively connected to the FCM 12, which is configured to control the operation of the fuel injector 28, wherein the FCM 12 is operatively connected to the fuel injector 28 by an injector ground 20. The FCS 14 is also operatively connected to the FCM 12 by, for example, a signal wire 16. In this embodiment, the FCS 14 is configured to sense the composition of the fuel as it returns from the fuel injector 28 to the fuel tank 26.

Figure 2:
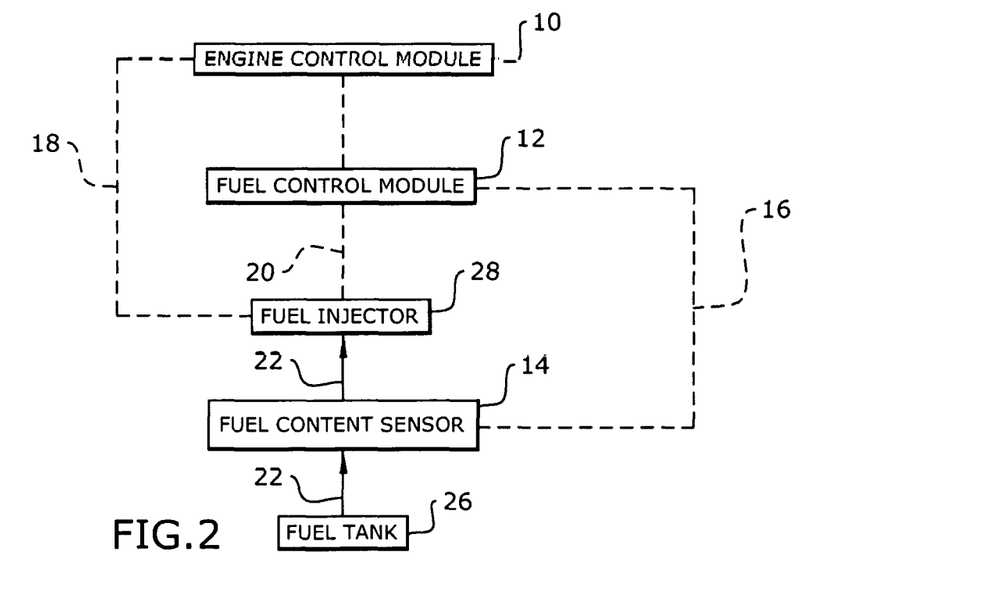
FIG. 2 is a schematic view of the first preferred embodiment of the invented system with the FCS positioned on a returnless fuel system.

Alternatively, in another embodiment and as shown in FIG. 2, the fuel control sensor 14 may be used in a system that does not include a return line and, thus, may be installed on the fuel feed line 22 between the fuel tank 26 and the fuel injector 28. The FCS 14 may again be operatively connected to the FCM 12 by, for example, a signal wire 16, wherein, based on the fuel content information sensed by the FCS 14, the FCM 12 may change the injector pulse width, if necessary.

Figure 3:
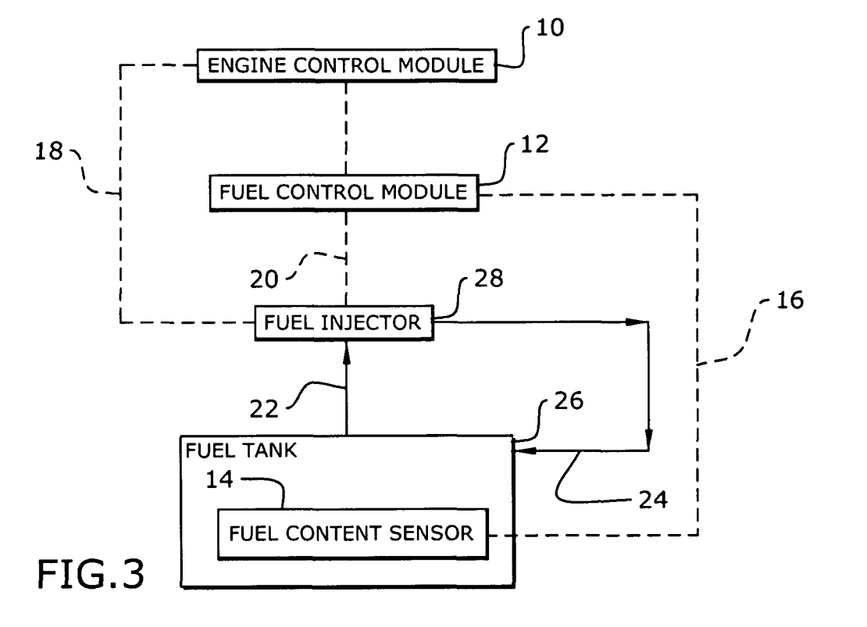
FIG. 3 is a schematic view of the first preferred embodiment of the invented system with the FCS in the fuel tank.

In yet a further embodiment and as shown in FIG. 3, the FCS 14 may be physically located within the fuel tank 14, wherein the fuel control sensor 14 is operatively attached to the FCM 12 by, for example, a signal wire 16, and the FCS 14 is configured to sense the composition of the fuel as soon as it is placed into the fuel tank 14. This type of system may either have a fuel return line 24, as shown in FIG. 3 or, alternatively, may be a returnless system, similar to that shown in FIG. 2. The FCS 14 may again be operatively connected to the FCM 12 by, for example, a signal wire 16, wherein, based on the fuel content information sensed by the FCS 14, the FCM 12 may change the injector pulse width, if necessary.

Figure 4:
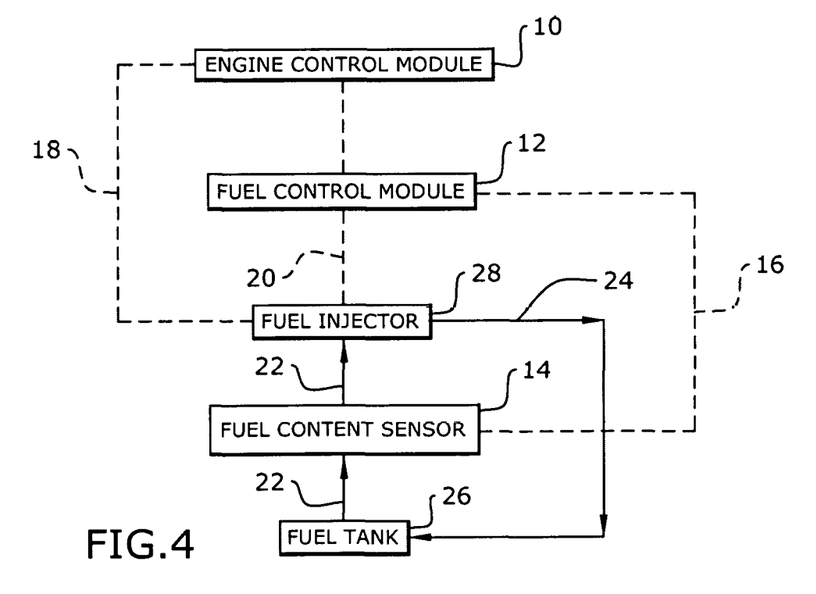
FIG. 4 is a schematic view of the first preferred embodiment of the invented system with the FCS on the pressure side of the fuel system.

In another embodiment and as shown in FIG. 4, the FCS 14 may be located on the fuel feed line 22 between the fuel tank 26 and fuel injector 28, similar to that in FIG. 2, except the system may also have a fuel return line 24 attaching the fuel injector 28 to the fuel tank 26. The FCS 14 may again be operatively connected to the FCM 12 by, for example, a signal wire 16, wherein, based on the fuel content information sensed by the FCS 14, the FCM 12 may change the injector pulse width, if necessary.

In any case, the FCS 14 may be configured to sense the composition of the fuel before it is injected into the engine and, thus, before combustion. The number of injector grounds 20 may vary depending on the number of fuel injectors 28 the engine has. Only one FCM 12 may be required to control any number of fuel injectors 28. Thus, there does not need to be a separate FCM 12 for each fuel injector 28. The system may be installed inline with a current system designed to be run on one fuel, resulting in the system being able to run on at least two separate fuels or a mixture thereof.

The FCS 14 may sense the content or composition of the fuel and provide this information to the FCM 12. The FCM 12 may be programmed to determine what the appropriate pulse width of the injector 28 is based on the content of the fuel and change the pulse width, if needed. Thus, the functioning of the factory installed ECM 10 may be unchanged even with use of the system of the present disclosure. Thus, the system may be proactive rather than other conventional systems, which are reactive. Additionally, the FCM 12 and FCS 14 may be considered an external, secondary, or piggyback fuel injector driver having the ability to modify the signals, as needed, to the injector 28 for proper fuel mixture when running the engine with more than one fuel.

Additional sensors may be added to the system of the present disclosure. For example, an oxygen sensor, an air metering sensor, a fuel temperature sensor, and/or an air temperature sensor may be added to the system. The addition of additional sensors may increase the accuracy of the system.

Figure 5:
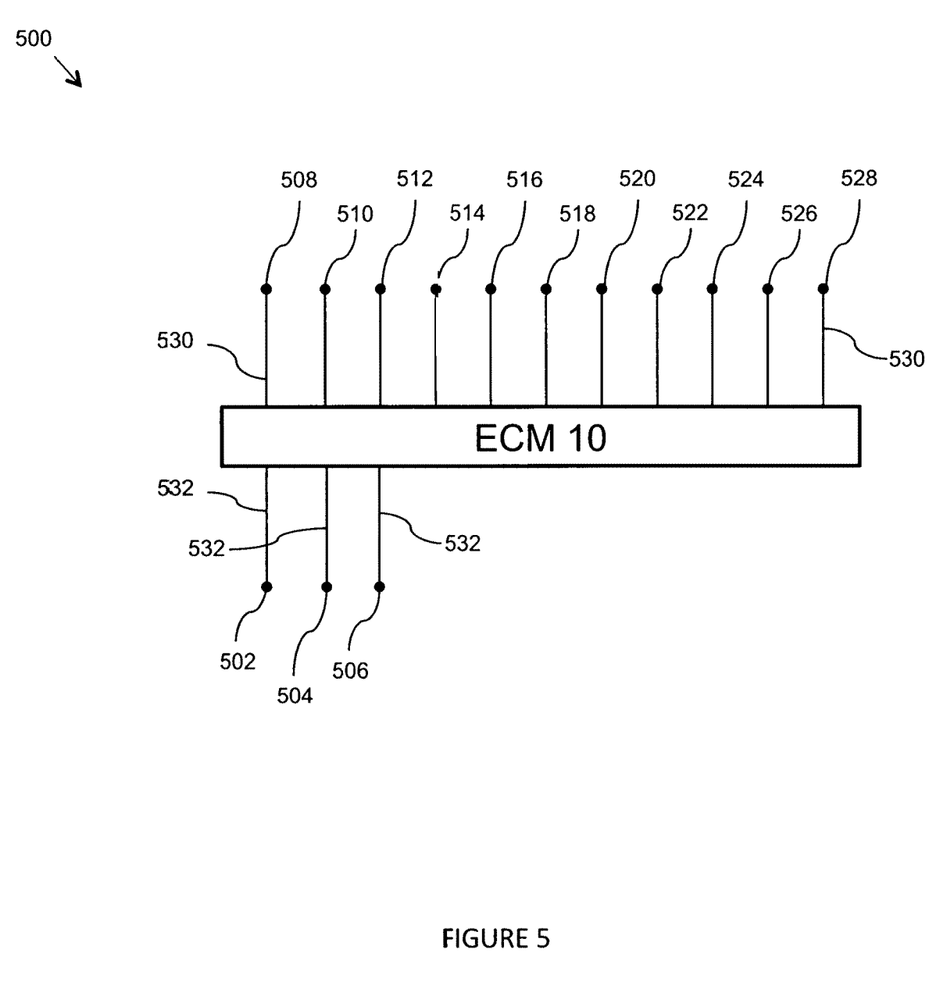
FIG. 5 is a block diagram of aspects of a prior art engine system.

Referring now generally to the Figures and particularly to FIG. 5, FIG. 5 is a block diagram of aspects of a prior art engine system 500. The prior art engine system 500 (hereinafter, "the engine system" 500) includes the ECM 10 communicatively coupled with a plurality of engine elements 502, 504 & 506 and a plurality of prior art sensors 508 through 528. Each of the plurality of engine elements 502, 504 & 506, specifically an idle control solenoid 502, an ignition timing module 504, and one or more alternate fuel injectors 506. It is understood that each alternate fuel injector may be or comprise a fuel injector 28.

The plurality of prior art sensors 508-528 include a mass airflow sensor 508, one or more air temperature sensors 510, an engine temperature sensor 512 a throttle position sensor 514, a fuel temp sensor 516, a fuel rail pressure sensor 518, one or more oxygen sensors 520, an exhaust gas temp sensor 522, a detonation sensor 524, a crank position sensor 526 and a camshaft position sensor 528. The mass airflow sensor 508 may be replaced with a manifold absolute pressure sensor, or MAP sensor, in prior art speed density systems. Individual air temperature sensors 510 may be separately positioned to specifically detect either an ambient temperature or manifold air temperature. The engine temperature sensor 512 may be sensing an engine coolant temperature (not shown). One or more oxygen sensors 520 are individually and separately positioned up or down stream from a catalytic Converter (not shown). The detonation sensor 524 detects knocking of the engine system 500. The crank position sensor 526 detects and reports the position and or the rotational speed of a crankshaft (not shown) of the engine system 500.

The plurality of prior art sensors 508-528 provide measurement signals to the ECM 10 via individually dedicated input signal lines 530. Each of the plurality of engine elements 502, 504 & 506 receive different control signals from the ECM 10 via individually dedicated output signal lines 532.

Figure 6:
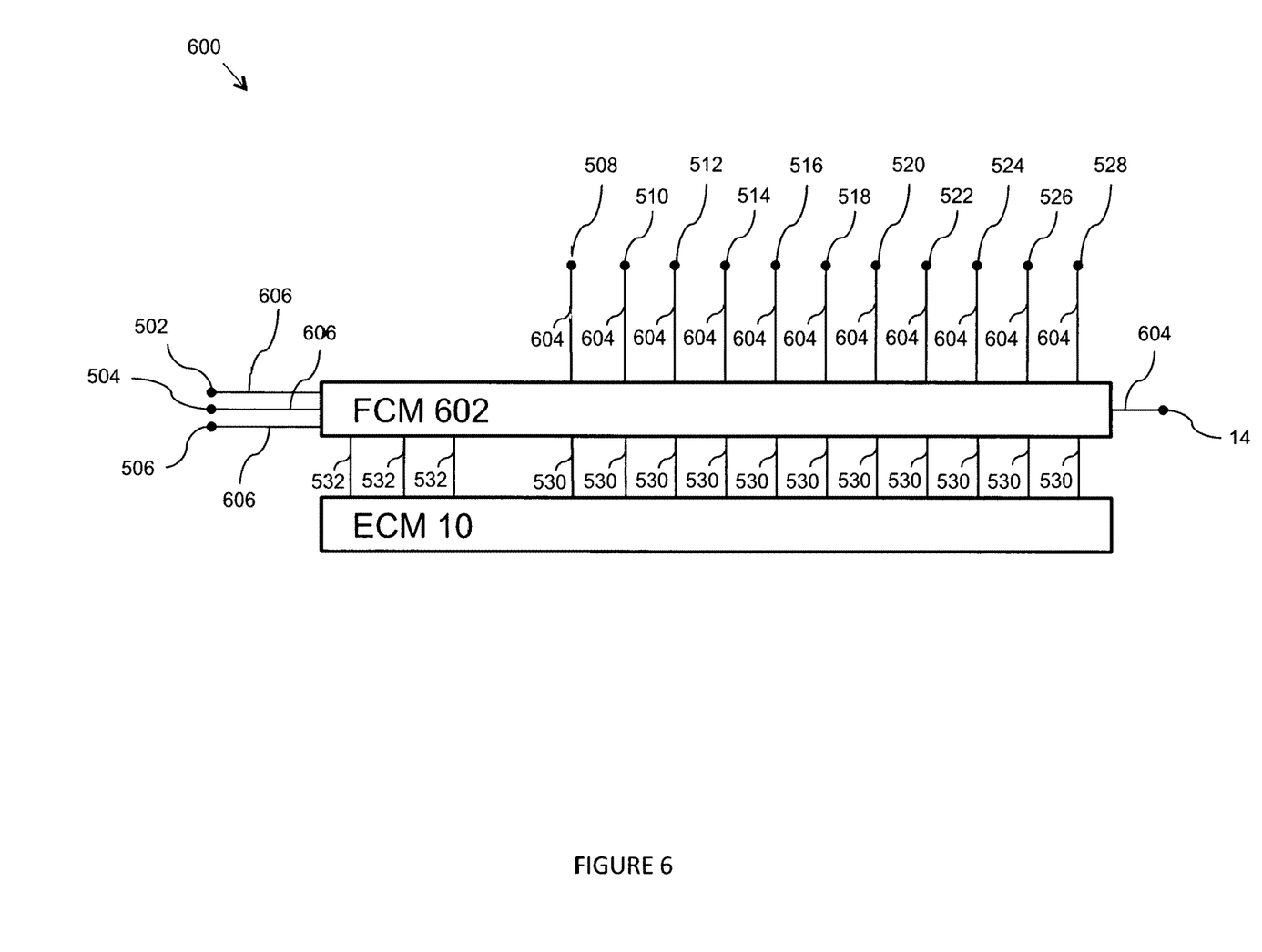
FIG. 6 is a block diagram of a second alternate preferred embodiment of the invented system having an alternate fuel control module communicatively coupled with the prior art engine system of FIG. 5.

Referring now generally to the Figures and particularly to FIG. 6, FIG. 6 is a block diagram of a second alternate preferred embodiment of the invented system (hereinafter, "the second system" 600) communicatively coupled with the engine system 500. The second system 600 comprises an alternate fuel control module 602 (hereinafter, "the second FCM 602") and a communicatively coupled dedicated FCS 14 per fuel injector 28 of the engine system 500. The second FCM 602 is communicatively disposed between the ECM 10 and (a.) the plurality of sensors 508-528 & 14 and (b.) the plurality of engine elements 502, 504 & 506. Each dedicated input signal line 530 of the engine system 500 is separately communicatively coupled with the second FCM 602 and each dedicated output signal line 532 is also separately communicatively coupled with the second FCM 602.

The plurality of prior art sensors 508-528 & the FCS 14 provide measurement signals to the second FCM 602 via individually dedicated FCM input signal lines 604 and each of the plurality of engine elements 502, 504 & 506 receive different control signals from the second FCM 602 via individually dedicated FCM output signal lines 606. The disposition of the second FCM 602 between the plurality of prior art sensors 508-528 and the ECM 10 enables the second FCM to modify measurement signals originating from the prior art sensors 508-528 and to substitute the received measurement signals with the modified signals (hereinafter, "the modified FCM signals") to the ECM 10, whereby the one or more of the substituted measurement signals originating from the prior art sensors 508-528 are not received by the ECM 10 and the one or more the modified FCM signals are each accepted by the ECM 10 as if having originated from a particular prior art sensor 508-528. Optionally, additionally or alternatively the disposition of the second FCM 602 between the prior art sensors 508-528 and the ECM 10 enables the second FCM to newly generate measurement signals (hereinafter, "the generated FCM signals") and to provide the one or more generated FCM signals to the ECM 10, whereby the measurement signals originating from the prior art sensors 508-528 are not received by the ECM 10 and the FCM generated measurement signals are each accepted by the ECM 10 as if having originated from a particular prior art sensor 508-528.

The disposition of the second FCM 602 between the plurality of engine elements 502, 504 & 506 and the ECM 10 enables the second FCM to modify control signals originating from the ECM 10 and to substitute these ECM output signals with the resultant modified control signals (hereinafter, "the FCM-modified control signals") to a particular engine module 502, 504 & 506, whereby the one or more of the control signals originating from the ECM 10 are not received by plurality of engine elements 502, 504 & 506 and the one or more the FCM-modified control signals are each separately accepted by a particular module of the plurality of engine elements 502, 504 & 506 as if having originated from the ECM 10.

The disposition of the second FCM 602 between the plurality of engine elements 502, 504 & 506 and the ECM 10 further optionally, additionally or alternatively enables the second FCM to receive control signals originating from the ECM 10 and to substitute these ECM output signals with newly generated control signals (hereinafter, "the FCM-generated control signals") and separately provide the one or more the FCM-generated control signals to a particular engine module 502, 504 & 506, whereby the one or more of the control signals originating from the ECM 10 are not received by plurality of engine elements 502, 504 & 506 and the one or more the modified FCM control signals are each separately accepted by a particular module of the plurality of engine elements 502, 504 & 506 as if having originated from the ECM 10.

Figure 7A:
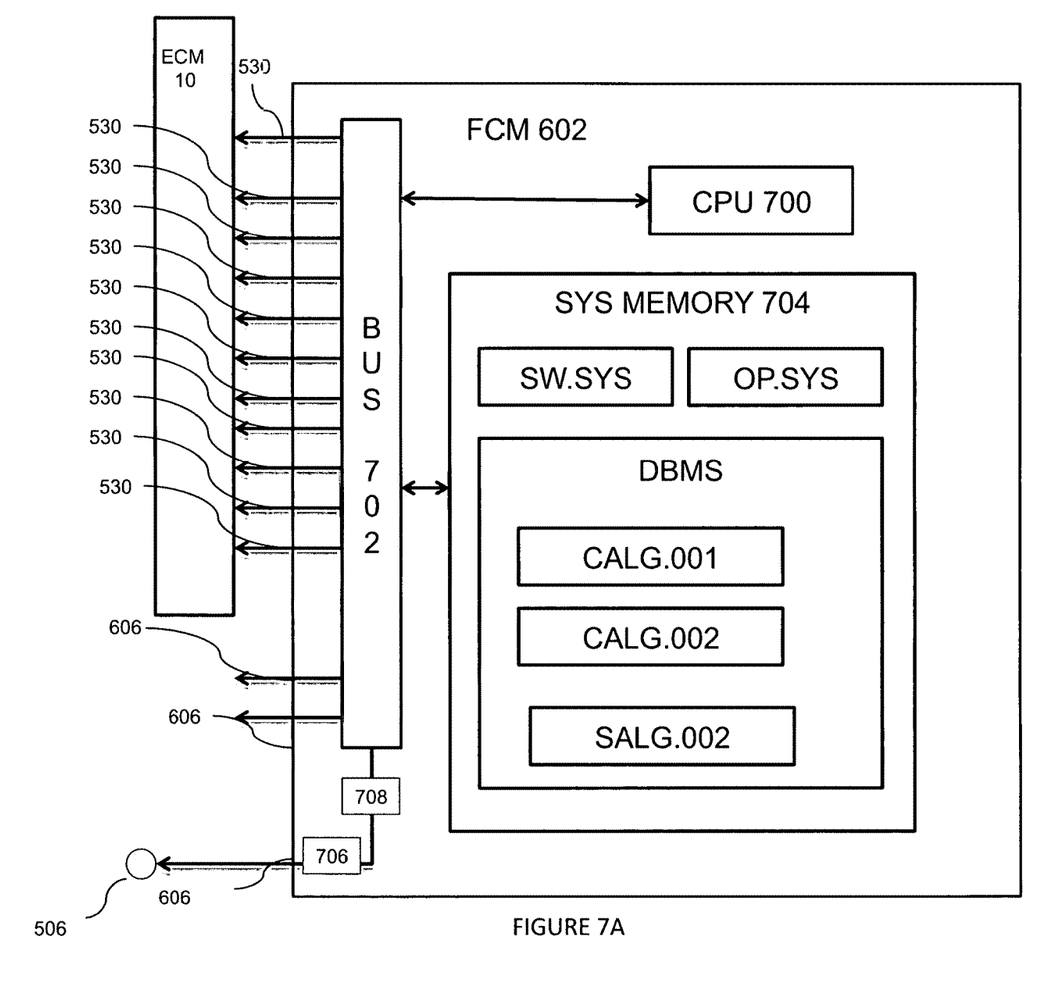
FIG. 7A is a detailed block diagram featuring the output signal lines and other elements of the alternate fuel control module of FIG. 6 as communicatively coupled with the prior art ECM of FIG. 5 and the engine system (not shown)

Referring now generally to the Figures and particularly to FIG. 7A, FIG. 7A is a detailed block diagram of elements of the second FCM 602 as communicatively coupled with the ECM 10. It is understood that the second FCM 602 may be or comprise a suitable electronic programmable gate array, field programmable gate array, controller, microcontroller, processor and/or microprocessor known in the art, such as but not limited to an MSP™ microcontroller as marketed by Texas Instruments, Inc. of Dallas, Tex.; a U4 BM77SPPS3MC2-0007AA PIC™ microcontroller as marketed by Microchip Technology, Inc. of Chandler, Ariz.; and/or a U10-17 PIC12F1571-USN PIC™ microcontroller as marketed by Microchip Technology, Inc. of Chandler, Ariz.

The second FCM 602 includes a central processing unit 700 (hereinafter, "CPU" 700) that is bidirectionally communicatively coupled via a communications bus to a system memory 704. The communications bus 702 additionally communicatively couples the CPU 700 and the memory 704 with the ECM 10 via the input signal lines 530 and the output signal lines 532. The communications bus 702 yet additionally communicatively couples the CPU 700 and the memory 704 with the FCS 14 via one dedicated FCM input signal line 604. It is understood that the communications bus 702 additionally communicatively couples the CPU 700 and the memory 704 with the engine elements 502, 504 & 506 via individually dedicated FCM output signal lines 606 and optionally individually and separately couples one or more of the engine system sensors 508-528 dedicated FCM input signal lines 604, as indicated in FIG. 6.

The memory 704 may be or comprise one or more registers, a reprogrammable logic, a firmware and/or a random access memory. The memory 704 stores an optional operating system OP.SYS and a system software SW.SYS. The operating system OP.SYS the software supports the basic functions of the second system 600, such as scheduling tasks, executing applications, and controlling peripherals. The system software SW.SYS enables the second system 600 to execute, perform and instantiate the required and optional aspects of the invented method.

The memory 704 further includes a first control signal algorithm CALG.001, a second control signal algorithm CALG.002, and an optional measurement signal algorithm SALG.002. The first control signal algorithm CALG.001 is applied by the second FCM 602 to modify an injector pulse signal as received from the ECM for delivery to one fuel injector 506 in view of the instant injector pulse signal as received from the ECM 10, a measurement received from the FCS 14 and optionally one or more measurement signals received from individual prior art sensors 508-528. The second control signal algorithm CALG.002 is applied by the second FCM 602 to newly generate a new injector pulse signal as received from the ECM for delivery to one fuel injector 506 in view of the instant control signal as received from the ECM 10, a measurement received from the FCS 14 and optionally one or more measurement signals received from individual prior art sensors 508-528.

The measurement signal algorithm SALG.001 is applied by the second FCM 602 to either generate a measurement signal value or modify a measurement signal value as received from an individual prior art sensor 508-528 for delivery to the ECM in view of the instant control signal as received by the second FCM 602 from the ECM 10, a measurement received from the FCS 14 and/or optionally one or more measurement signal values received from individual prior art sensors 508-528.

An injection pulse generation circuit 706 lies inline with the output signal line 606 to the injector 506, whereby the injection pulse generation circuit 706 newly generates an injection pulse as directed by the system software SW.SYS and alternatively implemented by the CPU 700. The newly generated pulse is transmitted from the injection pulse generation circuit 706 via the instant output signal line 606 and to the exemplary injector 506. Additionally, alternatively and/or optionally, an injection pulse modification circuit 708 lies inline with the same output signal line 606 to the injector 506, whereby the injection pulse modification circuit 708 modifies the injection pulse as received from the ECM 10, wherein this injection pulse modification is performed by the injection pulse modification circuit 708 as directed by the system software SW.SYS and alternatively implemented by the CPU 700. The newly modified pulse is transmitted from the injection pulse modification circuit 708 via the instant output signal line 606 and to the exemplary injector 506.

Figure 7B:
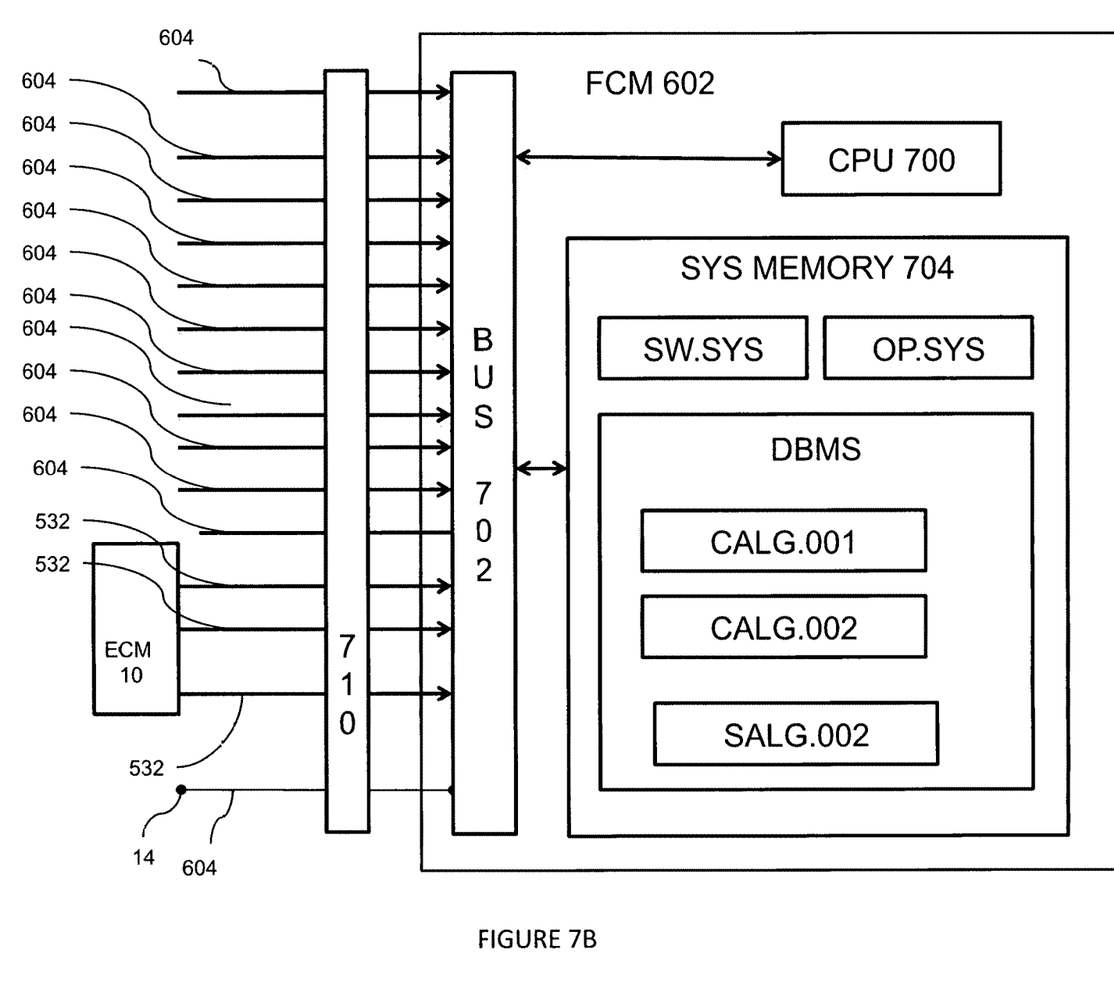
FIG. 7B is a detailed block diagram featuring the input lines, a power isolation filter, other elements of the alternate fuel control module of FIG. 6 as communicatively coupled with the prior art ECM of FIG. 5 and the engine system (not shown)

Referring now generally to the Figures and particularly to FIG. 7B, FIG. 7B is a detailed block diagram featuring the input signal lines 604 & 532, a power isolation filter 702, and other elements of the second FCM 602. The power isolation filter 702 is disposed between the origin points of the input signal lines 604 & 532 and the FCM communications bus 702 and limits the voltage and power that the communications bus 702 receives or is exposed to from the input signal lines 604 & 532 and thereby reduces the incidence of damage to the second FCM 602 from power surges transmitted via the input signal lines 604 & 532.

Figure 8:
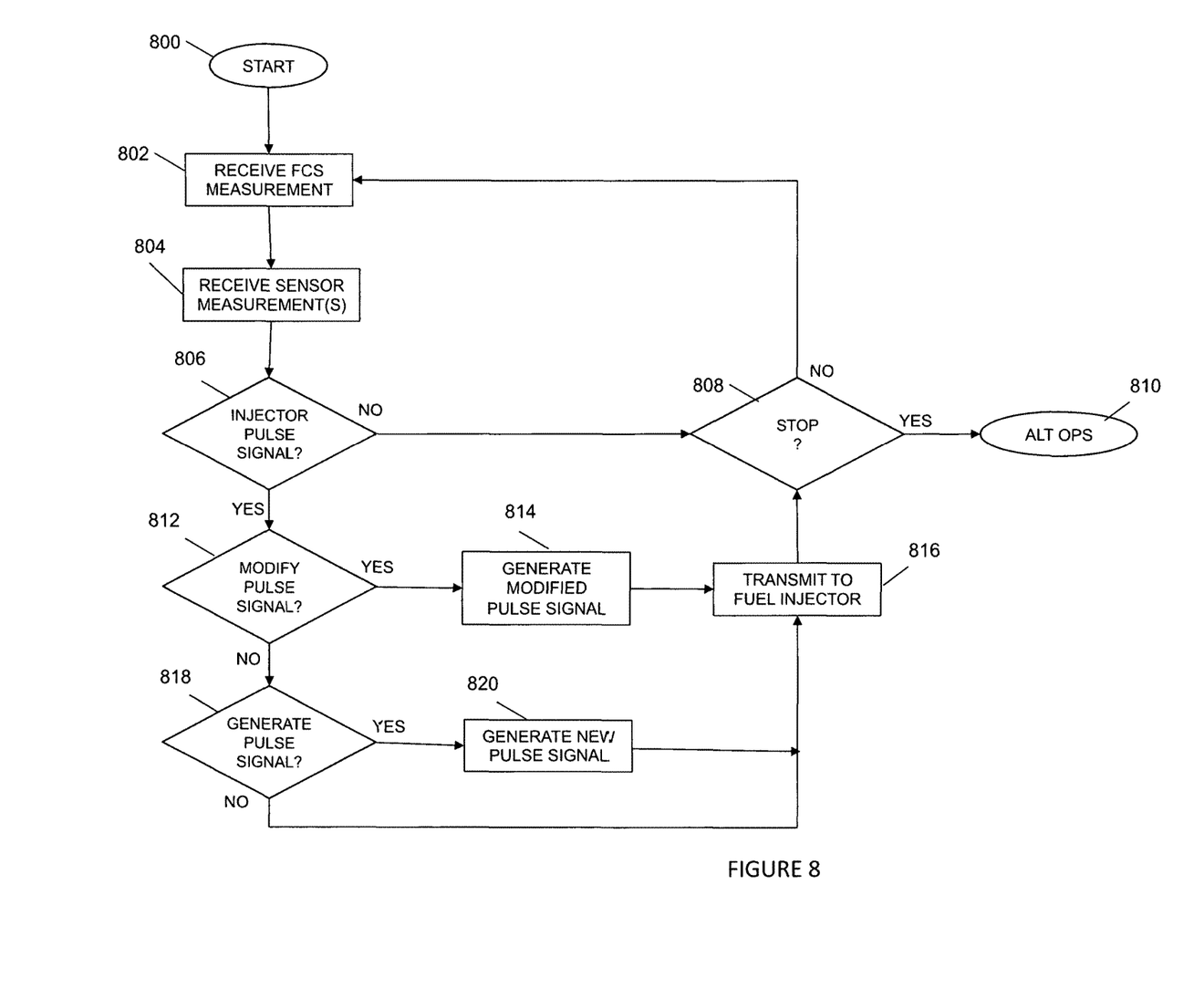
FIG. 8 is a flowchart of a first alternate embodiment of operations of the second alternate preferred embodiment of the invented system of FIG. 6.

Referring now generally to the Figures and particularly to FIG. 8, FIG. 8 is a flowchart of a first alternate embodiment of operations of the second system 600. The system software SW.SYS directs the operations of the second FCM 602 to execute, perform or instantiate the necessary and optional aspects 800-820 of the method of operations of FIG. 8. In step 800 the second FCM 602 connects with the ECM 10 and receives a fuel content measurement value for the FCS 14 in step 802. In optional step 804 the second FCM 602 receives one or more sensor measurement values from individual prior art sensors 508-528.

The second FCM 602 determines in step 806 whether an injector pulse signal has been received from the ECM 10. When the second FCM 602 determines in step 806 that an injector pulse signal has not been received from the ECM 10, the second FCM 602 proceeds on to step 808 and to determine whether to perform another iteration of the loop of steps 802 through 808 or alternatively to proceed on to perform alternate computational operations of step 810.

When the second FCM 602 determines in step 806 that an injector pulse signal has been received from the ECM 10, the second FCM 602 proceeds on to step 812 and to determine whether to (a.) apply the first calculation algorithm CALG.001 generate a modified injector pulse signal in step 8.14 and (b.) thereafter communicate the instant modified injector pulse signal to a particular fuel injector 506 in step 8.16.

When the second FCM 602 determines in step 8.12 to not proceed to step 814, the second FCM 602 proceeds on to step 8.18. In step 8.18 the second FCM 602 determines whether to (a.) apply the second calculation algorithm CALG.002 generate a new injector pulse signal in step 8.20 and (b.) thereafter communicate the instant new injector pulse signal to a particular fuel injector 506 in step 8.16. When the second FCM 602 determines in step 8.18 to not proceed to step 8.20, the second FCM 602 proceeds on to step 8.16 and optionally communicates the instant injector pulse signal as received in step 8.06 to a particular fuel injector 506 in step 8.16.

Offered for the sake of clarity of explanation, consider the first calculation algorithm CALG.001 as being directed to an engine system that is designed and configured to burn or run on a fuel mixture A, wherein the FCS 14 is adapted to detected a percentage of a fuel B in the fuel mixture and in the case wherein the ECM 10 is configured to run only on the fuel mixture A. An exemplary first calculation algorithm CALG.001 might be applied to modify the duration of an injector pulse signal in relation to the percentage by volume or weight of the fuel B instantaneously detected in the actual fuel mixture of the A fuel mixture and the B fuel as being delivered to an injector 506. Further consider that the pulse width calculation signal might direct the pulse width modification circuit 708 to modify the injector pulse signal as received from the ECM 10 and prior to transmission to the injector 506 and having the received pulse width extended in a relation to the percentage of the fuel B found in the stream of fuel mixture A and fuel B prior to introduction into the exemplary injector 506.

In terms of algorithmic expression, where:

PWMfmc=Width of the pulse width of the output injector pulse signal as modified by the injection pulse modification circuit 708;

PWecm=Width of the injector pulse width of an injector pulse signal as transmitted from the ECM 10;

Bfuel=measurement of the relative portion of the A fuel detected by the FCS 14 in the combination of the A fuel mixture and with an additional B fuel component and expressed as a fraction; and Coef=a coefficient applied to generate a preferred, an exemplary first whereby the first calculation algorithm CALG.001 might be expressed as follows:

$$PWMfcm=(PWecm)(1+Bfuel/Coef).$$

Also offered for the sake of clarity of explanation, consider the second calculation algorithm CALG.002 as being directed to an engine system that is designed and configured to burn or run on a fuel mixture A, wherein the FCS 14 is adapted to detected a percentage of a fuel B in the fuel mixture and in the case wherein the ECM 10 is configured to run only on the fuel mixture A. An exemplary second calculation algorithm CALG.002 might be applied to lengthen the duration of a newly generated injector pulse signal in relation to the percentage by volume or weight of the fuel B instantaneously detected in the actual fuel mixture of the A fuel mixture and the B fuel as being delivered to an injector 506. Further consider that the calculation might direct the pulse generation circuit 706 to generate a new pulse for transmission to the injector 506 having a pulse width equal to the original pulse width plus an additional width calculated by dividing the detected percentage of Fuel B as detected in by the FCS by 2 and multiplying the result by an original pulse width of an injector pulse received from the ECM. In an terms of algorithmic expression, where:

PWfmc=Width of the pulse width of an output injector pulse signal as newly generated by the pulse generation circuit 706;

PWecm=Width of the injector pulse width of an injector pulse signal as transmitted from the ECM 10;

Bfuel=measurement of the relative portion of the A fuel detected by the FCS 14 in the combination of the A fuel mixture and with an additional B fuel component and expressed as a fraction, an exemplary first whereby the second calculation algorithm CALG.002 might be expressed as follows:

$$PWfcm = PWecm + (½)(PWecm)(Bfuel).$$

Figure 9:
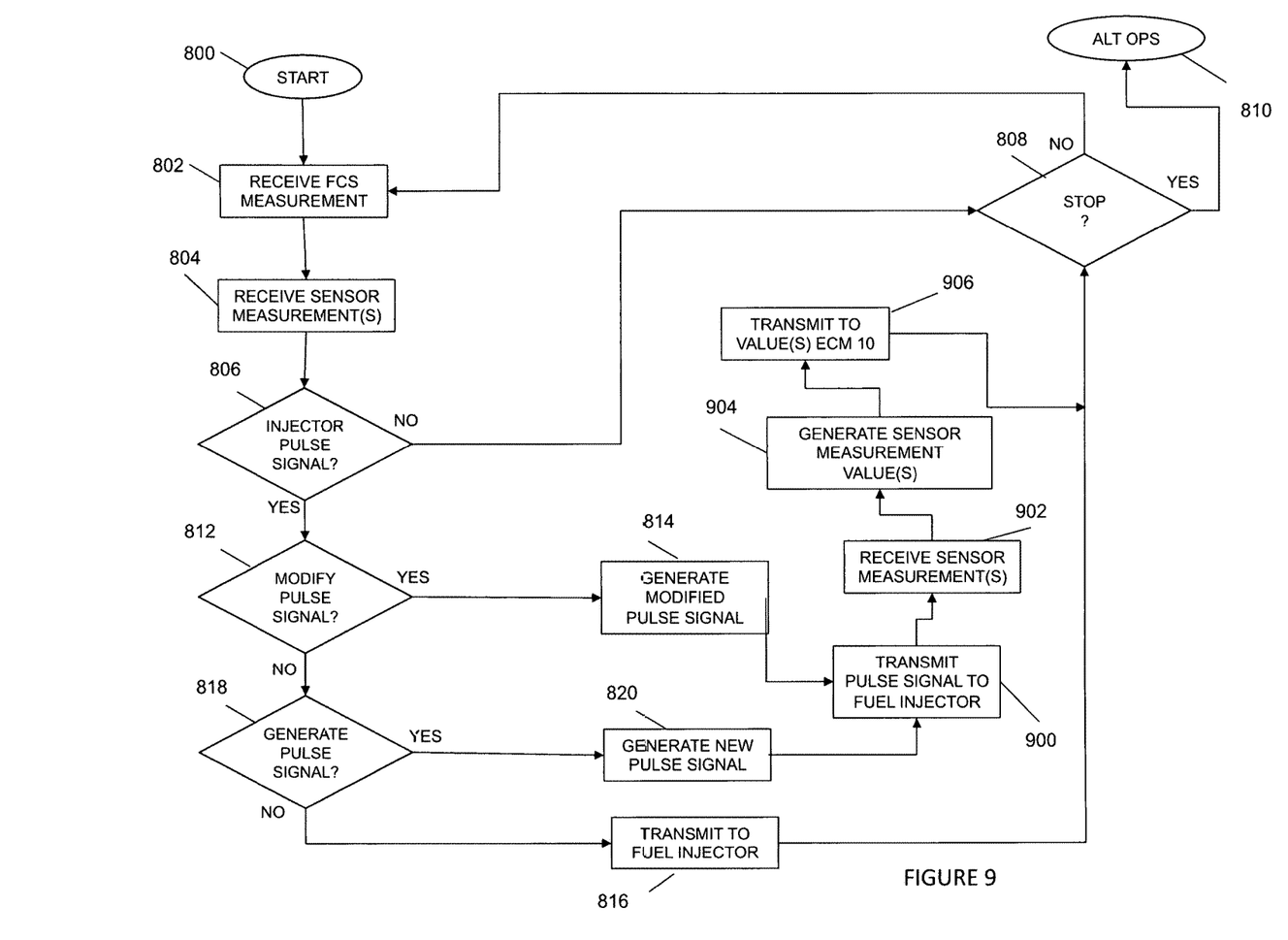
FIG. 9 is a flowchart of a second alternate embodiment of operations of the second alternate preferred embodiment of the invented system of FIG. 6 and including additional optional aspects related to the generation and/or modification of prior art sensor measurement values from the FCM of FIG. 6.

Referring now generally to the Figures and particularly to FIG. 9, FIG. 9 is a flowchart of a second alternate embodiment of operations of the second alternate preferred embodiment of the invented system of FIG. 6 and including additional optional aspects related to the generation and/or modification of prior art sensor measurement values from the FCM of FIG. 6. In the method of FIG. 9, the system software SYS. SW of the second FCM 602 proceeds from either step 814 or step 820 to step 900 and to transmit an injector pulse signal to a particular fuel injector 506. The second FCM 602 proceeds from step 900 to optional step 902 and receives in step 902 one or more sensor measurement values from individual prior art sensors 508-528. The second FCM 602 applies the first signal algorithm SALG.001 in step 904 to generate or modify one or more sensor measurement values and thereupon provides the instant generated or modified sensor measurement values to the ECM 10 in step 906. The second FCM 602 proceeds from step 906 to step 808.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. A system for engagement with a spark ignition fuel injection system, the spark ignition fuel injection system including an engine system comprising an engine control module operatively attached to a fuel injector, and a fuel tank attached to the fuel injector, the system comprising:
a fuel content sensor positioned externally of the fuel tank and configured to sense a content of fuel in the engine system before combustion of the fuel; and
a fuel control module, the fuel control module bi-directionally communicatively coupled with the engine control module, communicatively coupled to the fuel injector, and configured to receive fuel content information from the fuel content sensor and control both the information sent to the engine control module and the fuel injection pulse width instructions sent to the fuel injector, based on algorithmic assessment by the fuel control module of the fuel content information as detected, the fuel control module comprising:
a central processing unit coupled with a memory device; and
the memory device containing software-encoded commands, algorithms, and values selectively operable to direct the fuel control module to:
receive a first measurement signal from the fuel content sensor;
select a first pre-established algorithm to apply;
derive with the selected first algorithm applied to the first measurement signal a second signal for input into the engine control module in an operation of the engine control module;
provide the derived second signal to the engine control module;
receive a first fuel pulse width command from the engine control module directed to the fuel injector;
select a second pre-established algorithm to apply;
derive with the second algorithm an appropriate second fuel pulse width command for an operation of the fuel injector based on the first fuel pulse width command received from the engine control module; and
provide the derived second fuel pulse width command to the fuel injector.

2. The system of claim 1, wherein the fuel content sensor is communicatively coupled to the fuel control module by a signal channel.

3. The system of claim 1, wherein the fuel control module is communicatively disposed between the engine control module and the fuel injector.

4. The system of claim 3, wherein the fuel control module is adapted to derive a measurement value from an instance of a fuel content information received from the fuel content sensor and provide the measurement data to the engine control module.

5. The system of claim 3, wherein the fuel control module is adapted to receive an injector control signal from the engine control module and provide the injector control signal to the injector.

6. The system of claim 1, wherein the fuel tank is attached to the fuel injector by both a fuel feed line and a fuel return line; and the fuel content sensor is attached to the fuel return line between the fuel injector and the fuel tank.

7. The system of claim 1, wherein the fuel tank is attached to the fuel injector by a fuel feed line and the fuel content sensor is attached to the fuel feed line between the fuel tank and the fuel injector.

8. The system of claim 7, further comprising a fuel return line attaching the fuel injector to the fuel tank.

9. The system of claim 1, wherein the fuel content sensor is located within the fuel tank.

10. The system of claim 1, wherein the fuel content sensor is a sensor selected from the group consisting of an oxygen sensor, an air metering sensor, a fuel temperature sensor, and an air temperature sensor.

11. The system of claim 1, wherein the fuel content sensor detects alcohol content in the fuel.

12. The system of claim 11, wherein the fuel content sensor measures relative alcohol content of the fuel and reports a measurement of relative alcohol content to the fuel control module.

13. The system of claim 12, wherein the fuel control module applies an algorithm to the measurement of relative alcohol content received from the fuel content sensor to derive an injector control signal.

14. A system for engagement with a spark ignition fuel injection system, the spark ignition fuel injection system including an engine system comprising an engine control module operatively attached to a fuel injector, and a fuel tank attached to the fuel injector, the system comprising:

a fuel content sensor positioned externally of the fuel tank and configured to sense a content of fuel in the engine system before combustion of the fuel; and a fuel control module, the fuel control module bi-directionally communicatively coupled with the engine control module, communicatively coupled to the fuel injector, and configured to receive fuel content information from the fuel content sensor and control both the information sent to the engine control module and the fuel injection pulse width instructions sent to the fuel injector, based on assessment by the fuel control module of the fuel content information as detected, the fuel control module comprising:

a central processing unit coupled with a memory device; and the memory device containing software-encoded commands, algorithms, and values selectively operable to direct the fuel control module to:

receive a first measurement signal from the fuel content sensor;

process the first measurement signal to generate a second signal for input into the engine control module in an operation of the engine control module;

provide the processed second signal to the engine control module;

receive a first fuel pulse width command from the engine control module directed to the fuel injector;

process the first fuel pulse width command, in view of the first measurement signal information and first fuel pulse width information, into an appropriate second fuel pulse width command for an operation of the fuel injector; and provide the second fuel pulse width command to the fuel injector.

* * * * *

UNITED STATES PATENT AND TRADEMARK OFFICE
CERTIFICATE OF CORRECTION

PATENT NO. : 10,519,906 B2
APPLICATION NO. : 15/701389
DATED : December 31, 2019
INVENTOR(S) : Ryan Truax Page 1 of 1

It is certified that error appears in the above-identified patent and that said Letters Patent is hereby corrected as shown below:

In the Specification

Column 1, Line 6:
"Continuation-in-Part of U.S. Patent Application Serial Number 14/597,655"
Should read:
Continuation-in-Part both of U.S. Patent Application Serial Number 14/597,655 and also U.S. Patent Application Serial Number 61/927,557

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*